US009881274B2

United States Patent
Morrow et al.

(10) Patent No.: US 9,881,274 B2
(45) Date of Patent: Jan. 30, 2018

(54) UTILITY TIMERS IN A FOOD FRESHNESS PRINTER

(71) Applicant: Avery Dennison Retail Information Services, LLC, Mentor, OH (US)

(72) Inventors: Mark S. Morrow, Kettering, OH (US); Gary E. McMullen, Springboro, OH (US); Lavern C. Litmer, Miamisburg, OH (US); Douglas M Chandler, Centerville, OH (US)

(73) Assignee: AVERY DENNISON RETAIL INFORMATION SERVICES, LLC, Mentor, OH (US)

( * ) Notice: Subject to any disclaimer, the term of this patent is extended or adjusted under 35 U.S.C. 154(b) by 667 days.

(21) Appl. No.: 14/512,810

(22) Filed: Oct. 13, 2014

(65) Prior Publication Data
US 2016/0104102 A1  Apr. 14, 2016

(51) Int. Cl.
*G06Q 10/08* (2012.01)
*G06K 1/12* (2006.01)

(52) U.S. Cl.
CPC .......... *G06Q 10/087* (2013.01); *G06K 1/121* (2013.01)

(58) Field of Classification Search
CPC ...................... G06Q 10/087; G06K 1/121
USPC ........................................... 358/1.15
See application file for complete search history.

(56) References Cited

U.S. PATENT DOCUMENTS

| 9,080,707 | B2* | 7/2015 | Kohler | F16L 53/00 |
| 2002/0175209 | A1* | 11/2002 | Itoh | G06Q 20/28 235/380 |
| 2004/0085225 | A1 | 5/2004 | Wilson | |
| 2005/0179920 | A1 | 8/2005 | Bunsey et al. | |
| 2013/0088451 | A1* | 4/2013 | Payne | B41J 3/46 345/173 |
| 2013/0188207 | A1* | 7/2013 | Shiohara | H04N 1/60 358/1.9 |
| 2014/0204401 | A1 | 7/2014 | Salerno | |

FOREIGN PATENT DOCUMENTS

WO      2006/013349      2/2006

OTHER PUBLICATIONS

International Preliminary Report on Patentability (Chapter I) for PCT/US2014/060272 dated Apr. 18, 2017.
International search report dated Mar. 7, 2015 and written opinion issued in correspondence to International patent application No. PCT/US2014/060272.

* cited by examiner

*Primary Examiner* — Allen H Nguyen
(74) *Attorney, Agent, or Firm* — Avery Dennison Retail Information Services, LLC

(57) ABSTRACT

A method of adding a plurality of customizable event timers to a food freshness printer or smart printer is disclosed. The customizable event timers are added by the operator for the purpose of sounding an alarm to indicate an elapse in time and/or printing labels at a predetermined interval. When the event timer expires and the user acknowledges the audible tone, the user has the option to restart the timer for the next event or delete the timer. Further, the event timers enable the user to either display a message or print a set of labels when the timer expires.

7 Claims, 5 Drawing Sheets

UTILITY TIMERS IN A FOOD FRESHNESS PRINTER

BACKGROUND

The present invention relates generally to food freshness barcode printers or smart printers comprising a plurality of customizable timers. More particularly, the present disclosure relates to a method of adding a plurality of customizable timers by the operator for the purpose of sounding an alarm to indicate an elapse in time.

A barcode printer is a computer peripheral for printing barcode labels or tags that can be attached to, or printed directly on, physical objects. Barcode printers are commonly used to label cartons before shipment, or to label retail items with UPCs or EANs. The most common barcode printers employ one of two different printing technologies. Direct thermal printers use a print head to generate heat that causes a chemical reaction in specially designed paper that turns the paper black. Thermal transfer printers also use heat, but instead of reacting the paper, the heat melts a waxy or resin substance on a ribbon that runs over the label or tag material. The heat transfers ink from the ribbon to the paper.

Barcode printers are designed for different markets. Industrial barcode printers are used in large warehouses, manufacturing facilities, and food facilities. They have large paper capacities, operate faster and have a longer service life. For retail and office environments, desktop barcode printers are most common.

Furthermore, in a traditional food preparation, or other suitable area, there are several functions, operations, tasks, etc., that either occur on a timed or a periodic basis. Thus, employees tend to either lose time by waiting on a task, or get overwhelmed trying to keep track of all the functions, operations, and tasks, etc.

Thus, there exists a need for a food freshness barcode printers or smart printers that comprises a plurality of customizable timers. The present invention discloses a method of adding a plurality of customizable timers by the operator for the purpose of sounding an alarm to indicate an elapse in time. When the timer expires and the user acknowledges the audible tone, the user has the option to restart the timer for the next event or delete the timer.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

The subject matter disclosed and claimed herein, in one aspect thereof, comprises a method of adding a plurality of customizable event timers to a food freshness printer or smart printer. Specifically, the customizable event timers are added by the operator for the purpose of sounding an alarm to indicate an elapse in time.

In a preferred embodiment, when the event timer expires and the user acknowledges the audible tone, the user has the option to restart the timer for the next event or delete the timer. Further, the event timers enable the user to either display a message or print a set of labels when the timer expires.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

Figure 1:
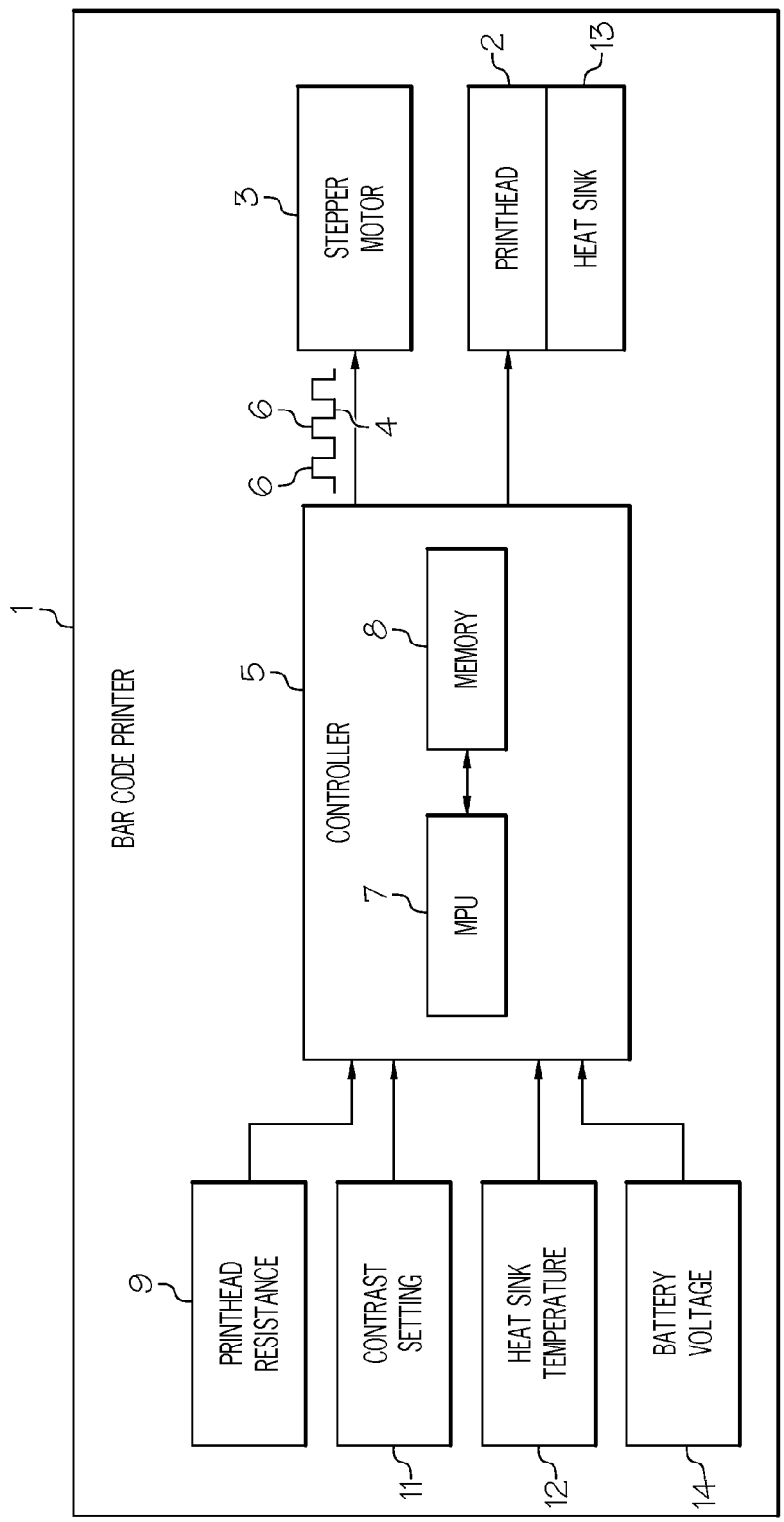
FIG. 1 illustrates a block diagram of a bar code printer in accordance with the disclosed architecture.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof.

The present invention discloses a method of adding a plurality of customizable event timers to a food freshness printer or smart printer. The customizable event timers are added by the operator for the purpose of sounding an alarm to indicate an elapse in time. When the event timer expires and the user acknowledges the audible tone, the user has the option to restart the timer for the next event or delete the timer. Further, the event timers enable the user to either display a message or print a set of labels when the timer expires.

Referring initially to the drawings, FIG. 1 illustrates a bar code printer 1 in accordance with the present invention, however any suitable bar code printer can be used as is known in the art. The bar code printer 1 comprises a thermal print head 2 for printing barcodes and alphanumeric information on a web of record members such as tags, labels or the like. The supply of the web of record members may be of the direct printing type such that the record members include paper coated with a thermally responsive material. Alternatively, the supply used with the bar code printer 1 may be of the transfer type wherein a carbon ribbon is heat activated by the print head 2 so as to print on the record members. The print head 2 is strobed to control the amount of energy applied thereto for printing. More particularly, current is applied to the print head 2 during a strobe time in order to print one line on a record member.

The bar code printer 1 also includes a stepper motor 3 or the like that is responsive to a periodic drive signal 4, the period 6 of which is defined by the time between the leading edges of consecutive or adjacent pulses of the drive signal.

The stepper motor 3 is responsive to the drive signal 4 to advance the web of record members past the print head 2 for printing. The drive signal 4 controls the speed of the stepper motor 3 which in turn controls the print speed of the bar code printer 1.

A controller 5 includes a microprocessor 7 or the like which operates in accordance with software routines stored in a memory 8 so as to control the operations of the bar code printer 1. A number of sensors, monitors, detectors or the like such as depicted at 9, 11, 12, and 14, monitor operating conditions of the bar code printer 1 including the resistance of the print head 2, the contrast setting of the barcode printer, the temperature of a heat sink 13 on which the print head 2 is mounted and the voltage of a battery powering the bar code printer 1. The measured values of the print head resistance, contrast setting, heat sink temperature, battery voltage, as well as other operating variables if desired, are utilized by the microprocessor 7 when implementing print speed control.

Generally referring to FIGS. 2A-D, the disclosed food freshness barcode printer, or any other suitable barcode printer or smart printer comprises at least one customizable event timer. This event timer(s) enables a user to either display a message or print a set of labels when the timer expires. Further, when the timer expires and the user acknowledges the audible tone, the user has the option to restart the timer for the next event or delete the timer.

In a food preparation area there are several functions that either occurs on a timed or a periodic basis. For example, if frozen rolls required defrosting before being placed on a food ready table for order fulfillment, a user could set a timer that would expire at the end of the defrost period and that would then print a label for freshness dating. Thus, the function of setting the timer would enable the food preparation staff to focus on other tasks until the defrost period for the rolls has expired. Once the defrost period for the rolls has expired, the timer will emit an audible noise and then the printer will automatically print the required labels for freshness dating (i.e., the labor saving steps of printing the freshness labels with no additional interaction will be executed).

Figure 2A:
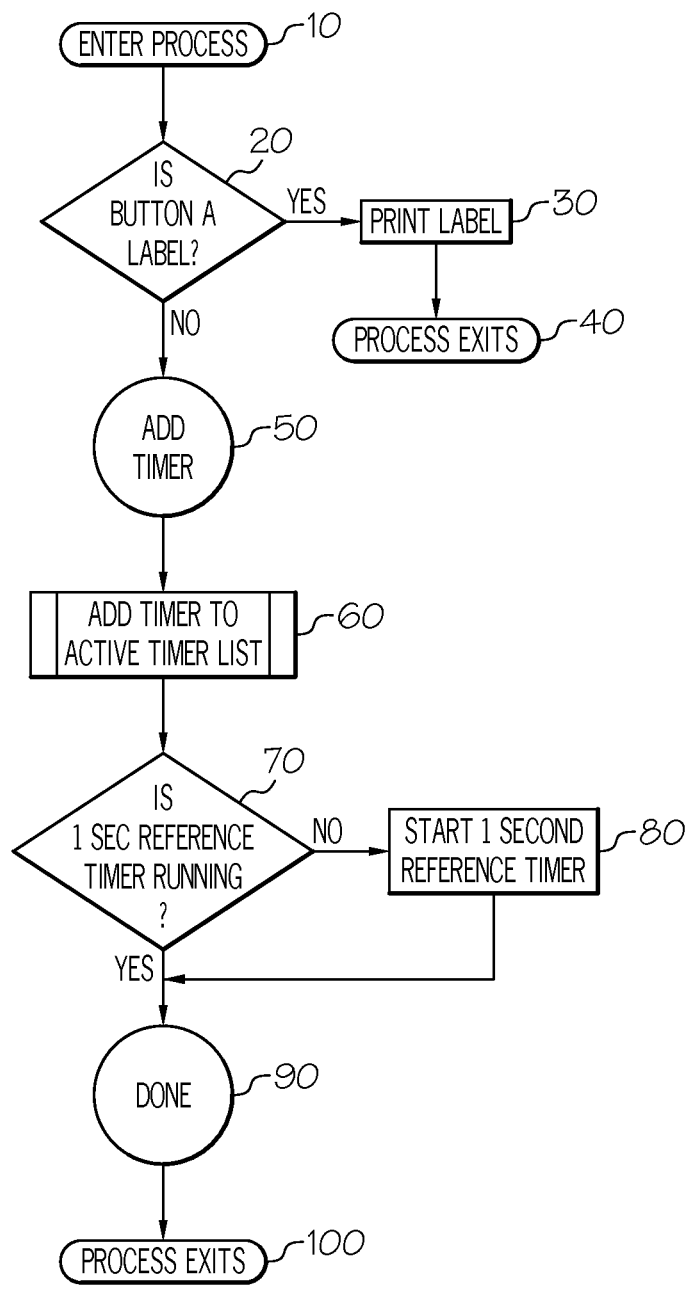
FIG. 2A illustrates a flowchart of the item select form process preinstalled in a food freshness printer or smart printer in accordance with the disclosed architecture.

For example as shown in FIG. 2A, entry point 10 is where the user enters the button process (or the item select form process). At 20, it is determined if the button is a label or not. If the button is a label, then at 30 the label batch is printed (i.e., print job), and at 40 the process exits. If the button is not a label (i.e., not a print job), then at 50 an active event timer is added. At 60, the event timer is then added to the active timer list. At 70, it is determined if the one second reference timer is running. If the one second reference timer is not running, then at 80 the one second reference timer is started. If the one second reference timer is running, then at 90 the process is complete and exits at 100.

Figure 2B:
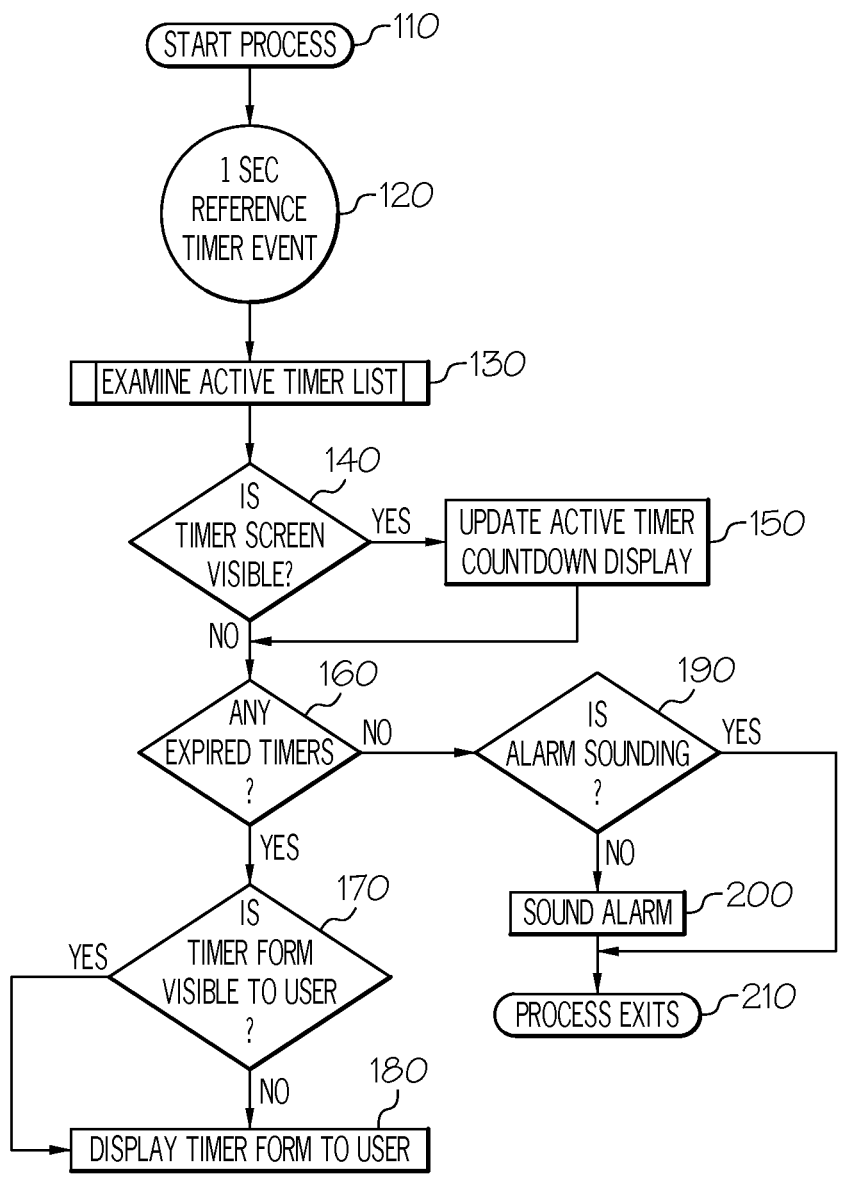
FIG. 2B illustrates a flowchart of the reference timer event process preinstalled in a food freshness printer or smart printer in accordance with the disclosed architecture.

As shown in FIG. 2B, the reference timer event process starts at 110. At 120 the one second reference timer has expired. At 130, the active timer list is examined. At 140, it is determined whether the timer screen is visible. If the timer screen is visible, then at 150 the user updates the active timer count down display. If the timer screen is not visible, then at 160 it is determined if there are any expired timers. If there are not any expired timers, then it is determined if an alarm is sounding at 190. If there are expired timers, then at 170 it is determined if the timer form is visible to a user. If the timer form is visible to a user, then it is determined if an alarm is sounding at 190. If the timer form is not visible to a user, then at 180 the timer form is displayed to a user. Then at 190, it is determined if an alarm is sounding. If an alarm is sounding, then the process exits at 210. If an alarm is not sounding, then the process advances to 200 where an alarm is sounded. Then, the process is complete and exits at 210.

Figure 2C:
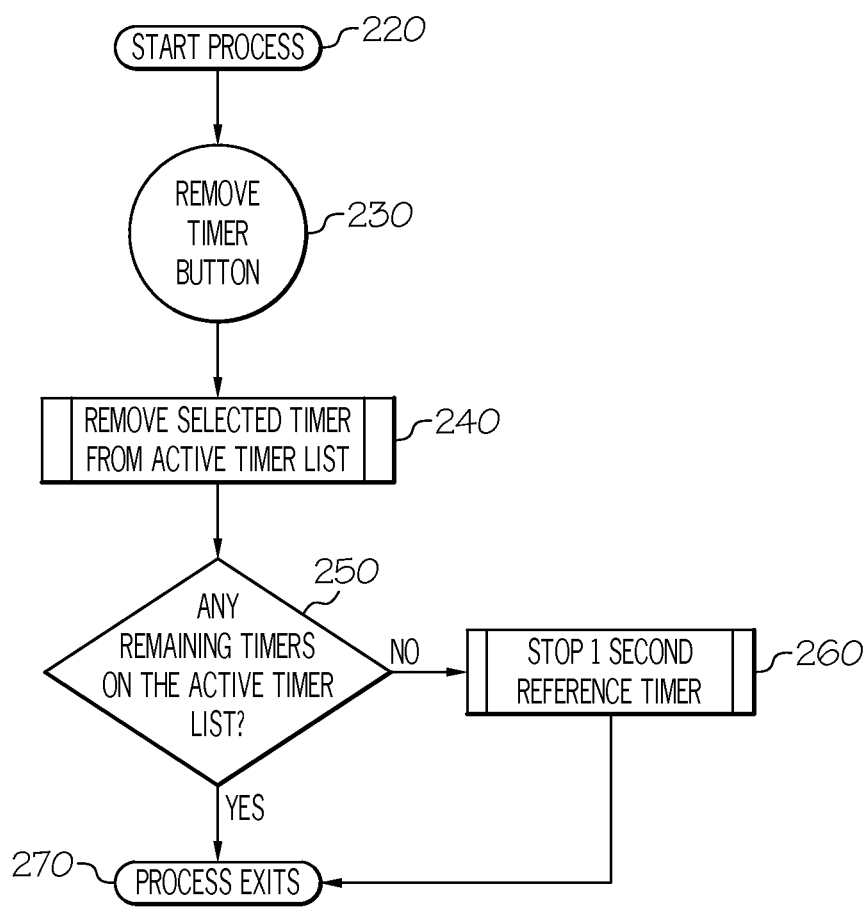
FIG. 2C illustrates a flowchart of the timer form remove timers process preinstalled in a food freshness printer or smart printer in accordance with the disclosed architecture.

As shown in FIG. 2C, the timer form remove timers process starts at 220. At 230, the process continues to the remove timer button. At 240, the process removes the selected timer from an active timer list. At 250, it is determined whether there are any remaining timers on the active timer list. If there are no remaining timers on the active timer list, then at 260 the one second reference timer is stopped. Then, the process exits at 270. If there are remaining timers on the active timer list, then the timers are processed and the process is complete and exits at 270.

Figure 2D:
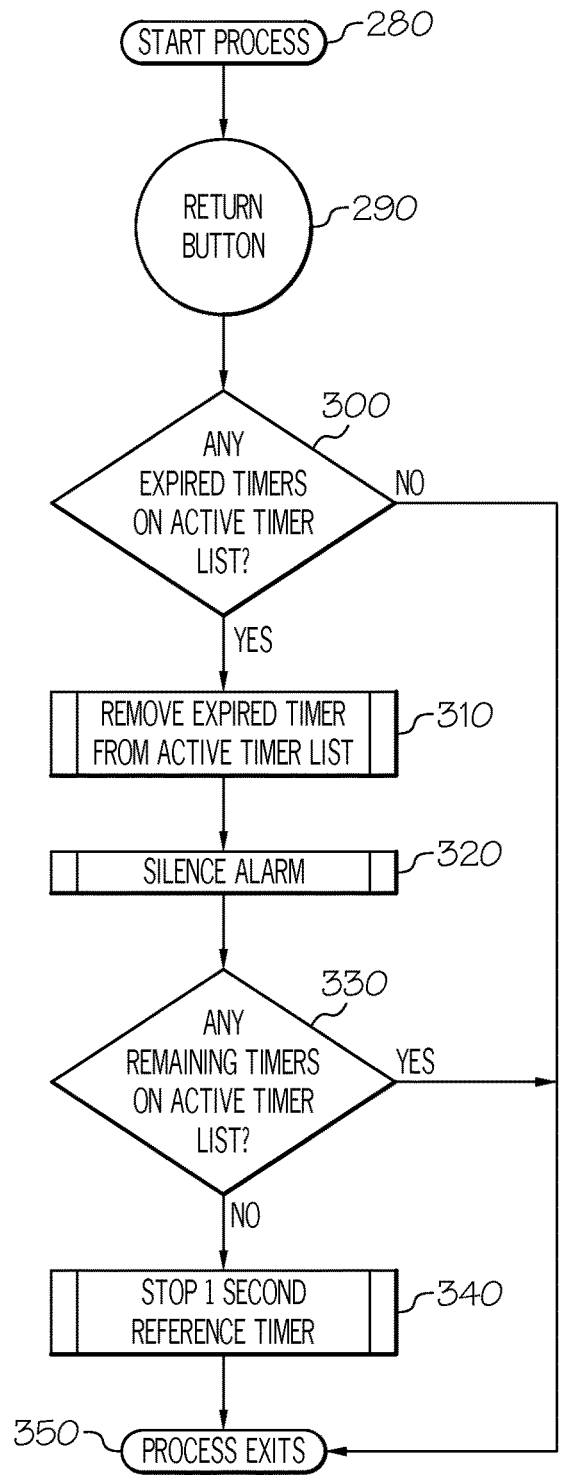
FIG. 2D illustrates a flowchart of the acknowledge timer process preinstalled in a food freshness printer or smart printer in accordance with the disclosed architecture.

As shown in FIG. 2D, the acknowledge timer process starts at 280. At 290, the user depresses the return button. At 300, it is determined if there are any expired timers on the active timer list. If there are no expired timers on the active timer list, then the process exits at 350. If there are expired timers on the active timer list, then at 310 the expired timers are removed from the active timer list. At 320, the alarm is silenced. At 330, it is determined if there are any remaining timers on the active timer list. If there are remaining timers on the active timer list, then the timers are processed and the process is complete and exits at 350. If there are no remaining timers on the active timer list, then at 340 the one second reference timer is stopped (or terminated). Then, the process exits at 350.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A process for creating timer events in a food freshness barcode printer or smart printer that will sound on a periodic basis or at the elapsing of a specific time, comprising the steps of:
    starting a process;
    stopping a one second reference timer;
    examining an active timer list; and
    determining whether a timer screen is visible.

2. The process of claim 1, further comprising:
    if the timer screen is visible, then updating an active timer count down display; and
    if the timer screen is not visible, then determining if there are any expired timers.

3. The process of claim 2, further comprising:
    if there are not any expired timers, then determining if an alarm is sounding; and
    if there are expired timers, then determining if a timer form is visible to a user.

4. The process of claim 3, further comprising:
    if the timer form is visible to a user, then determining if an alarm is sounding;
    if the timer form is not visible to a user, then displaying the timer form to a user; and
    determining if an alarm is sounding.

5. The process of claim 4, further comprising:
if an alarm is sounding, then exiting the process;
if an alarm is not sounding, then advancing the process to where an alarm is sounded; and
completing and exiting the process.

6. The process of claim 5, wherein at an end of a timer event, a reminder message can be displayed to a user.

7. The process of claim 6, wherein there is no predetermined limit on a number of active timers allowed in the system.

* * * * *